United States Patent
Song

(10) Patent No.: US 9,614,698 B2
(45) Date of Patent: Apr. 4, 2017

(54) TRANSMITTER SWITCHING EQUALIZATION FOR HIGH SPEED LINKS

(71) Applicant: SAMSUNG DISPLAY CO., LTD., Yongin, Gyeonggi-Do (KR)

(72) Inventor: Sanquan Song, Mountain View, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/823,909

(22) Filed: Aug. 11, 2015

(65) Prior Publication Data

US 2016/0065395 A1 Mar. 3, 2016

Related U.S. Application Data

(60) Provisional application No. 62/042,710, filed on Aug. 27, 2014.

(51) Int. Cl.
*H04L 25/49* (2006.01)
*H04L 25/03* (2006.01)
*H04B 1/04* (2006.01)
*H04L 25/02* (2006.01)

(52) U.S. Cl.
CPC ......... *H04L 25/03019* (2013.01); *H04B 1/04* (2013.01); *H04L 25/0272* (2013.01); *H04L 25/49* (2013.01); *H04L 25/03878* (2013.01)

(58) Field of Classification Search
CPC ......... G09G 2310/027; G09G 2370/08; G09G 3/2096; G09G 2310/0275; G06F 3/0412; H04L 27/01; H04J 1/08; H04J 3/025
See application file for complete search history.

(56) References Cited

U.S. PATENT DOCUMENTS

| | | | |
|---|---|---|---|
| 6,266,367 B1* | 7/2001 | Strait | H03H 21/0012 370/286 |
| 2009/0167750 A1* | 7/2009 | Hong | G09G 3/2096 345/213 |
| 2010/0057230 A1* | 3/2010 | Sato | G10L 21/038 700/94 |
| 2010/0296589 A1* | 11/2010 | Maeda | H04L 25/4917 375/257 |
| 2011/0134076 A1* | 6/2011 | Kida | G06F 3/0412 345/174 |
| 2013/0100971 A1 | 4/2013 | Kunes et al. | |
| 2013/0287311 A1* | 10/2013 | Furihata | G06T 9/00 382/233 |
| 2014/0204990 A1 | 7/2014 | Song et al. | |
| 2014/0226707 A1 | 8/2014 | Kaviani et al. | |

* cited by examiner

*Primary Examiner* — Vineeta Panwalkar
(74) *Attorney, Agent, or Firm* — Lewis Roca Rothgerber Christie LLP

(57) ABSTRACT

A serial data transmitter utilizing switching equalization. The transmitter includes a first per-bit switcher configured to invert of every other bit of the stream of bits to form a switched signal; a filter configured to filter the switched signal to form a filtered signal; and a second per-bit switcher configured to invert every other bit of the filtered signal.

20 Claims, 13 Drawing Sheets

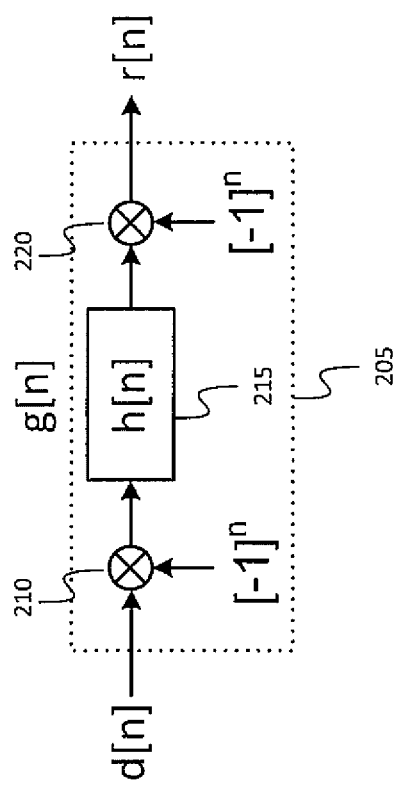
FIG. 2A
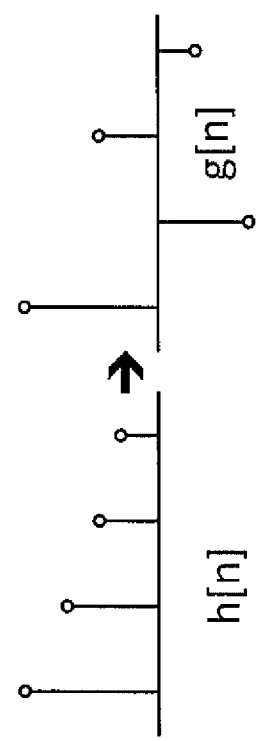
FIG. 2B
FIG. 2C

TRANSMITTER SWITCHING EQUALIZATION FOR HIGH SPEED LINKS

CROSS-REFERENCE TO RELATED APPLICATION(S)

The present application claims priority to and the benefit of U.S. Provisional Application No. 62/042,701, filed Aug. 27, 2014, entitled "TRANSMITTER SWITCHING EQUALIZATION FOR HIGH SPEED LINKS", the entire content of which is incorporated herein by reference.

FIELD

One or more aspects of embodiments according to the present invention relate to digital data transmission and more particularly to a system and method for data transmission through a channel with a non-uniform frequency response.

BACKGROUND

In systems for transmitting digital data through an imperfect channel, e.g., a channel with higher loss at high frequencies than at low frequencies, changes in the digital waveform upon transmission through the channel may result in data errors. Techniques such as the use of a receiver continuous time linear equalizer or of a decision feedback equalizer may be used to correct for high frequency loss in a channel, or for other changes in the waveform resulting from transmission through a non-ideal channel.

These techniques have various disadvantages such as high power consumption, as in the case of a continuous time linear equalizer, where explicit peaking at the Nyquist frequency requires additional power. Moreover, a peaking filter may consume a significant amount of area, e.g., on an integrated circuit chip.

Thus, there is a need for a simple, low-power system and method for providing equalization for an imperfect channel.

SUMMARY

Aspects of embodiments of the present disclosure are directed toward a system and method for switching equalization in a serial data transmitter. The transmitter switches the polarity of every other serial bit to form a switched signal, filters the switched signal with a low-pass filter, to form a filtered signal, and then switches the polarity of every other serial bit of the filtered signal again, forming an output signal that is high-pass filtered, thereby providing equalization for a channel with a low-pass transmission characteristic.

According to an embodiment of the present invention there is provided a transmitter for transmitting a serial stream of bits, each bit having a polarity, the transmitter including: a first per-bit switcher configured to switch the polarity of every other bit of the serial stream of bits to form a switched signal; a filter configured to filter the switched signal to form a filtered signal; and a second per-bit switcher configured to switch the polarity of every other bit of the filtered signal.

In one embodiment, the transmitter includes a multiplexer including the first per-bit switcher and the filter.

In one embodiment, the filter is a differential resistor-capacitor (RC) low-pass filter, the multiplexer includes a first output resistor and a second output resistor, and the first and second output resistors form, with one or more capacitances, the differential resistor-capacitor (RC) low-pass filter.

In one embodiment, a drain capacitance of a transistor of the multiplexer is a capacitance of the one or more capacitances.

In one embodiment, the multiplexer includes: a first differential pair; a first control transistor to enable the first differential pair; a second differential pair; and a second control transistor to enable the second differential pair.

In one embodiment, the filter is a low-pass filter having a dominant pole frequency being about the same as a dominant pole frequency of a serial transmission channel.

In one embodiment, the second per-bit switcher includes: a first differential pair; a first control transistor to enable the first differential pair; a second differential pair; and a second control transistor to enable the second differential pair.

In one embodiment, the multiplexer has a select input, and the second per-bit switcher has a select input connected to the select input of the multiplexer.

In one embodiment, the transmitter includes a pre-driver connected to the second per-bit switcher, and a driver connected to the pre-driver, each of the driver and the pre-driver including two transistors in a differential pair configuration.

According to an embodiment of the present invention there is provided a transmitter for transmitting a serial stream of bits, the transmitter having an input and including: a multiplexer connected to the input of the transmitter, the multiplexer configured to form a serialized signal; and a per-bit switcher connected to the multiplexer, the per-bit switcher configured to invert every other bit of the serialized signal.

In one embodiment, the multiplexer is configured to convert a two-bit wide parallel data stream into a first serial stream of bits, and to invert every other bit in the first serial stream of bits.

In one embodiment, the transmitter is configured to filter the first serial stream of bits with a low-pass filter.

In one embodiment, a system includes the transmitter and a serial transmission channel, wherein a dominant pole of the low-pass filter is at about the same frequency as a dominant pole of the serial transmission channel.

In one embodiment, the transmitter includes a pre-drive buffer connected to the per-bit switcher.

In one embodiment, an output impedance of the multiplexer and an input impedance of the per-bit switcher are configured as a low-pass filter.

In one embodiment, a system includes the transmitter and a serial transmission channel, wherein a dominant pole of the low-pass filter is at about the same frequency as a dominant pole of the serial transmission channel.

In one embodiment, the transmitter includes a drive buffer connected to the pre-drive buffer.

According to an embodiment of the present invention there is provided a display including: a timing controller; a driver integrated circuit (IC); and a serial data link connecting the timing controller and the driver IC, the timing controller including a transmitter, the transmitter having an input and including: a multiplexer connected to the input of the transmitter, the multiplexer configured to form a serialized signal; and a per-bit switcher connected to the multiplexer, the per-bit switcher configured to invert every other bit of the serialized signal.

In one embodiment, the multiplexer is configured to convert a two-bit wide parallel data stream into a first serial stream of bits, and to invert every other bit in the first serial stream of bits.

In one embodiment, a system includes the display and a serial transmission channel, wherein: the transmitter is configured to filter the first serial stream of bits with a low-pass filter, and a dominant pole of the low-pass filter is at about the same frequency as a dominant pole of the serial transmission channel.

BRIEF DESCRIPTION OF THE DRAWINGS

These and other features and advantages of the present invention will be appreciated and understood with reference to the specification, claims and appended drawings wherein:

FIG. 2A is a block diagram of a composite filter according to an embodiment of the present invention;

FIG. 2B is a graph of an impulse response of a central filter according to an embodiment of the present invention;

FIG. 2C is a graph of an impulse response of a composite filter according to an embodiment of the present invention;

DETAILED DESCRIPTION

The detailed description set forth below in connection with the appended drawings is intended as a description of exemplary embodiments of a system and method for transmitter switching equalization for high speed links provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

An electrical channel for transmitting high-speed serial digital data (i.e., a serial transmission channel) may provide a non-uniform frequency response, e.g., it may have a low-pass frequency response, according to which the attenuation of high-frequency components of the signal transmitted through the channel may be greater than the attenuation of low-frequency components. A data sequence when transmitted into the channel may be composed of ones and zeros represented as two different levels (e.g., voltages or currents), a first level and a second level, with sharp transitions between them. These levels may be provided at the input of the channel by a transmitter (TX) and updated at a rate referred to herein as the data rate, or twice the Nyquist frequency. The non-uniform frequency response of the channel may result in an altered waveform, lacking sharp transitions or well-defined levels, being received. This may cause inter-symbol interference and errors in a receiving circuit designed to recover the data sequence. Related art approaches to mitigating this problem include the use of a receiver continuous time linear equalizer (CTLE) for preferentially amplifying the high-frequency components of the signal to provide gain ("peaking") at frequencies near the Nyquist frequency, and the use of a sense amplifier with a decision feedback equalizer (SA/DFE).

Figure 1A:
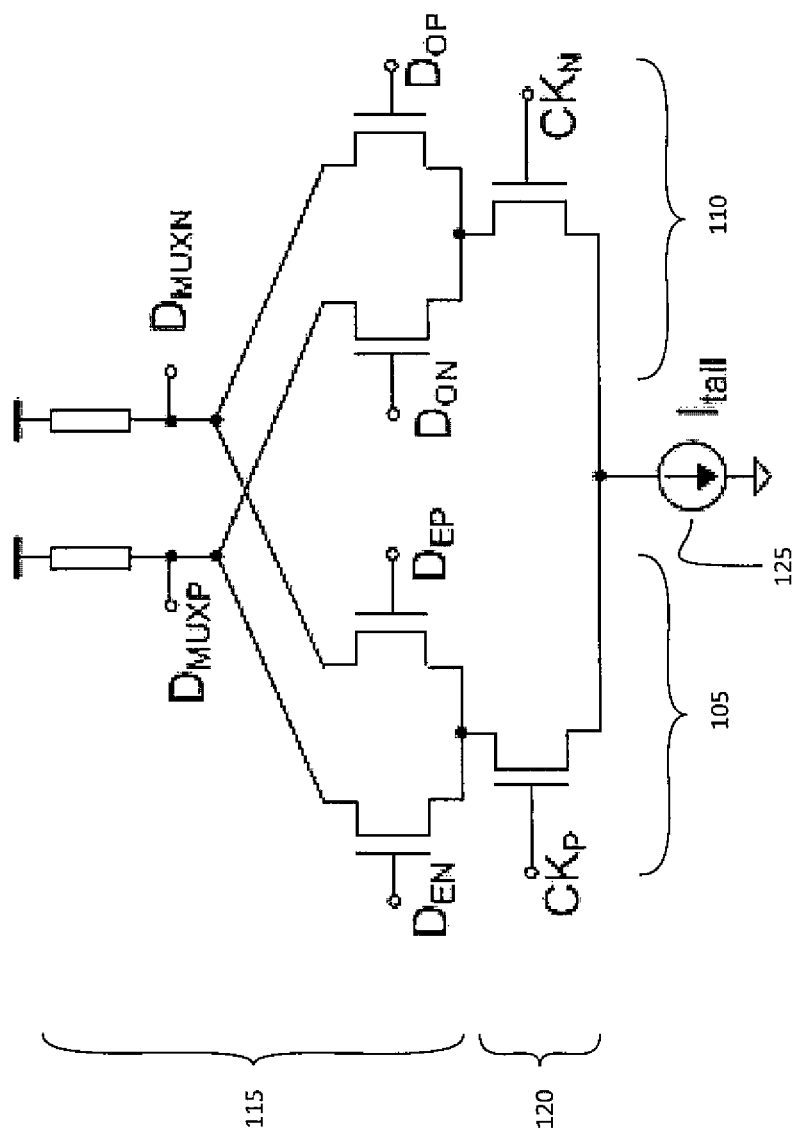
FIG. 1A is a schematic diagram of an output multiplexer.

Referring to FIG. 1A, the transmitter for a high speed link may include an output multiplexer (OMUX) that receives half-rate data on a two-bit wide bus (e.g., having an even bit and an odd bit, in parallel) and multiplexes this data stream into a single serial stream, i.e., a serial stream of bits. The two-bit wide bus may have a first (e.g., "even") data lane, a second (e.g., "odd") data lane, and a clock (or "parallel clock") lane carrying a parallel clock signal. All three of these lanes may carry differential signals, i.e., a "positive" signal on a positive conductor, and the complement of the positive signal, a "negative" signal, on a negative conductor. The signal on the clock lane may be a 50% duty cycle square wave with one transition (e.g., a rising transition in the positive parallel clock signal $CK_P$ and a negative transition in the negative parallel clock signal $CK_N$) coinciding with transitions in the data, and the other transition (e.g., a falling transition in the positive parallel clock signal) falling halfway between transitions in the data.

The output multiplexer of FIG. 1A includes a left arm 105 and a right arm 110, each including a differential pair 115 and a control transistor 120. As used herein, a differential pair is a circuit with two transistors, and two output resistors, the output resistors being connected (e.g., directly connected) to a first power supply line and to respective first electrodes (e.g., drains) of the two transistors, the second electrodes (e.g., sources) of the two transistors being connected (e.g., directly connected) together at a common node, and (indirectly) connected or directly connected to a current source 125 connected (e.g., directly connected) to a second power supply line. The control electrodes (e.g., the gates) of the two transistors are the inputs of the differential pair (or, equivalently, they together form the differential input of the differential pair), and the first electrodes of the transistors are the outputs (or, equivalently, they together form the differential output) of the differential pair.

In the output multiplexer of FIG. 1A, the two differential pairs share a pair of output resistors and a current source 125. The first differential pair outputs the even bit ($D_{EN}$ and $D_{EP}$) during the half of the parallel clock cycle when $CK_P$ is high and the control transistor 120 in the left arm 105 enables the left differential pair 115 in the left arm (i.e., the control transistor allows current to flow from the common node of the differential pair to the current source 125). The first differential pair similarly outputs the odd bit ($D_{ON}$ and $D_{OP}$) during the other half of the parallel clock cycle, when $CK_N$ is high and the control transistor 120 in the right arm 110 enables the differential pair 115 in the right arm.

Figure 1C:
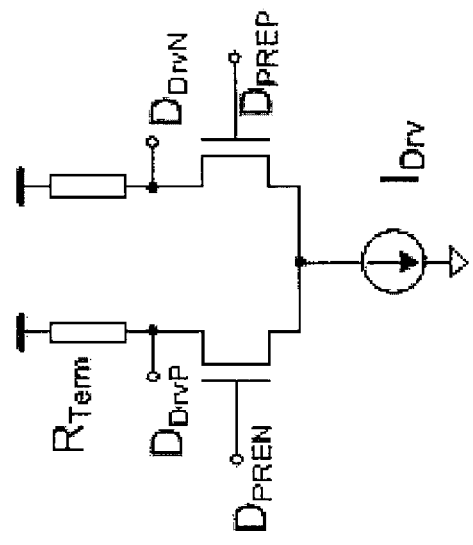
FIG. 1C is a schematic diagram of a driver.
Figure 1B:
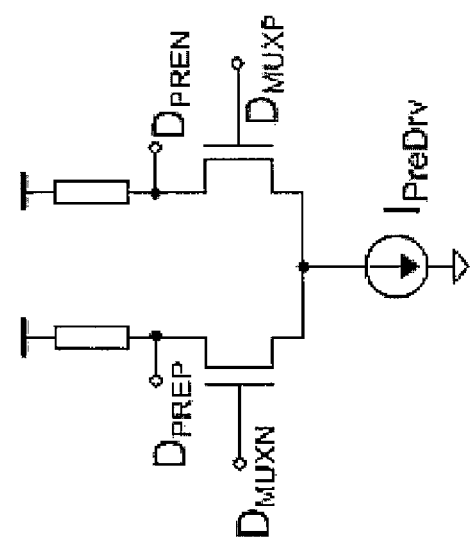
FIG. 1B is a schematic diagram of a pre-driver.
Figure 1D:
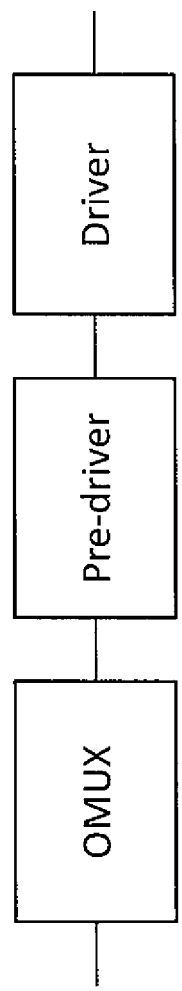
FIG. 1D is a block diagram of a cascade of a multiplexer, a pre-driver, and a driver.

Referring to FIG. 1B, the transmitter may further include a pre-driver (PreDrv) that buffers the output multiplexer output, and, referring to FIG. 1C, a driver (Drv) that further buffers the output and provides an output impedance matching the characteristic impedance (e.g., the differential mode characteristic impedance) of the channel. Referring to FIG. 1D, these three elements may be connected (e.g., directly connected) in cascade, e.g., the output of the output multiplexer may be connected (e.g., directly connected) to the input of the pre-driver and the output of the pre-driver may be connected (e.g., directly connected) to the input of the driver.

As mentioned above, and as will be understood by one of skill in the art, the inputs and outputs of the circuit elements (e.g., the multiplexer, the pre-driver and the driver) may be differential inputs and outputs, each including two conductors carrying complementary signals. One of the conductors may be referred to as the positive conductor, and one of the conductors may be referred to as the negative conductor. When a differential connection (e.g., a differential input or a differential output) of one element is connected (e.g., directly connected) to a differential connection of another element, the positive conductors of the connections are connected (e.g., directly connected) to each other and the negative conductors of the connections are connected (e.g., directly connected) to each other. Thus, a connection shown in the drawings as a single line (e.g., in FIGS. 1D and 3) may represent two conductors carrying a differential signal composed of a signal and its complement.

Various embodiments of the present invention employ the principle that a high-pass filter may be constructed from a low-pass filter utilizing two multiplications by a periodic switching signal, e.g., multiplications by a square wave at a switching frequency, which may be the Nyquist frequency. If the input signal is a serial stream of bits with a bit rate equal to the Nyquist frequency, then such a multiplication may have the effect of switching the polarity of, i.e., inverting, every other bit in the signal. Referring to FIG. 2A, according to this principle, a filter (or "composite filter") 205 with impulse response g[n], may be composed of a first multiplier 210, a filter (or "central filter") 215 with impulse response h[n] and a second multiplier 220. The input signal to the filter is first multiplied (in the first multiplier 210) by the switching signal, to form a switched signal. The switched signal is filtered by the central filter 215 to form a filtered signal, which is then multiplied (in the second multiplier 220) by the switching signal. The composite filter 205 has an impulse response that may be derived as follows:

$$r[n] = ((d[n] \times [-1]^n) * h[n]) \times [-1]^n$$

$$= \left( \sum_{k=-\infty}^{+\infty} d[n-k] \times ([-1]^{n-k} \times h[k])[-1]^n \right)$$

$$= \sum_{k=-\infty}^{+\infty} d[n-k] \times ([-1]^k \times h[k])$$

$$= d[n] * ([-1]^n \times h[n])$$

$$= d[n] * g[n],$$

where $g[n]=[-1]^n \times h[n]$, d[n] is an input signal, r[n] is the resulting output signal, n is a sample number index, and k an integer used as a dummy variable for the summation.

Thus, if the central filter 215 is a high-pass filter, then the composite filter 205 will be a low-pass filter, and if the central filter 215 is a low-pass filter, e.g., a filter with the impulse response h[n] shown in FIG. 2B, then the composite filter 205 will be a high-pass filter, with the impulse response g[n] shown in FIG. 2C. Specifically, if the central filter is a low-pass filter with a lowest-frequency pole (or "dominant pole") at a frequency $f_p$, then the composite filter may be a band-pass filter (or "peaking filter") with a center frequency at the switching frequency (e.g., at the Nyquist frequency) and a bandwidth of $2f_p$, which behaves, below the Nyquist frequency, as a high-pass filter (and thus it may be referred to herein as a high-pass filter). Each multiplier, which switches the polarity of every other bit, may also be referred to as a per-bit switcher.

In one embodiment, a transmitter includes an output multiplexer, and a high pass filter is implemented in the transmitter by configuring the output multiplexer to act as both a multiplexer and a per-bit switcher, by selecting component values in the output multiplexer to act as a low-pass filter, and by employing a second per-bit switcher in the transmitter to perform the role of the second multiplier in the switched filter of FIG. 2A.

Figure 3:
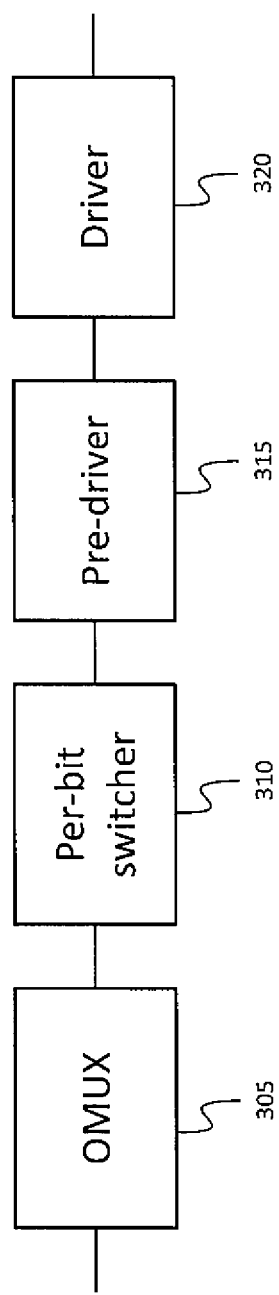
FIG. 3 is a block diagram of a transmitter circuit according to an embodiment of the present invention.

A block diagram of the resulting system for transmitting a serial stream of bits is shown in FIG. 3; it differs from the block diagram of the transmitter of FIG. 1D in that it contains the second per-bit switcher 310. In the embodiment of FIG. 3, the output multiplexer (OMUX) 305 has a two-bit wide parallel input and multiplexes the two-bit wide parallel data stream to form a serialized signal, i.e., a single serial stream of bits. The output multiplexer 305 also, as described below, switches the polarity of every other bit (i.e., it includes a first per-bit switcher), and filters the result with a low-pass filter. The output of the output multiplexer 305 is connected (e.g., directly connected) to the input of the second per-bit switcher 310, the output of which is connected (e.g., directly connected) to the input of a pre-driver (or "pre-drive buffer") 315. The output of the pre-driver is connected (e.g., directly connected) to the input of a driver (or "drive buffer") 320. Each of the per-bit switchers (the second per-bit switcher 310, and the other per-bit switcher integrated into the output multiplexer 305) may be controlled by a switching signal, which may be the parallel clock signal of the two-bit wide bus.

Figure 4:
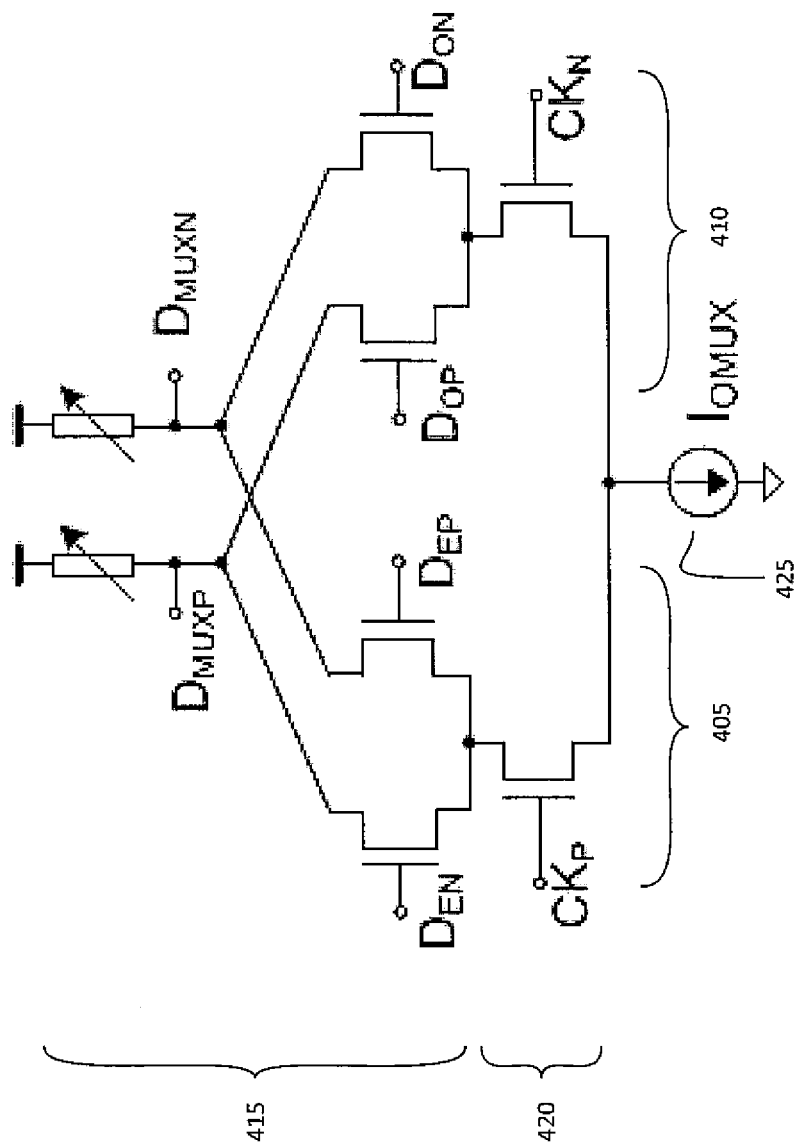
FIG. 4 is a schematic diagram of a multiplexer including a per-bit switcher and components of a low-pass filter circuit, according to an embodiment of the present invention.
Figure 7:
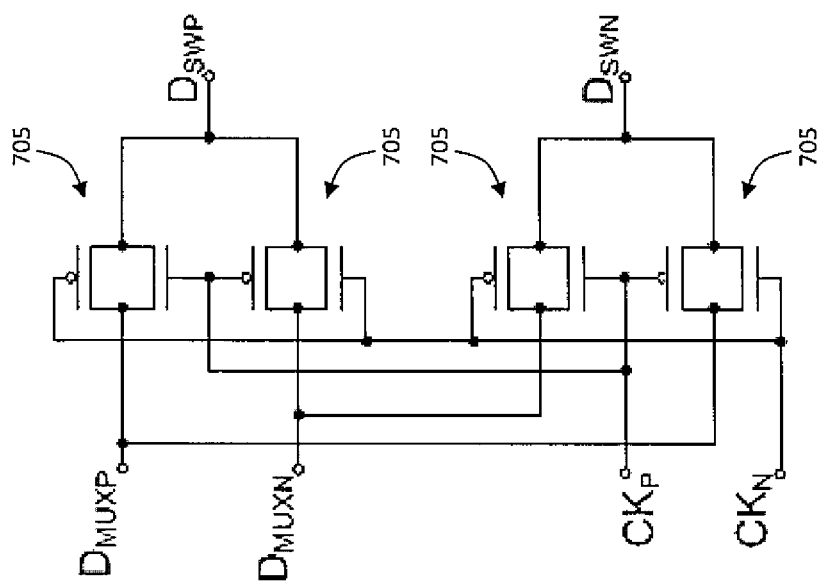
FIG. 7 is a schematic diagram of a pass-gate based per-bit switcher according to an embodiment of the present invention.
Figure 8:
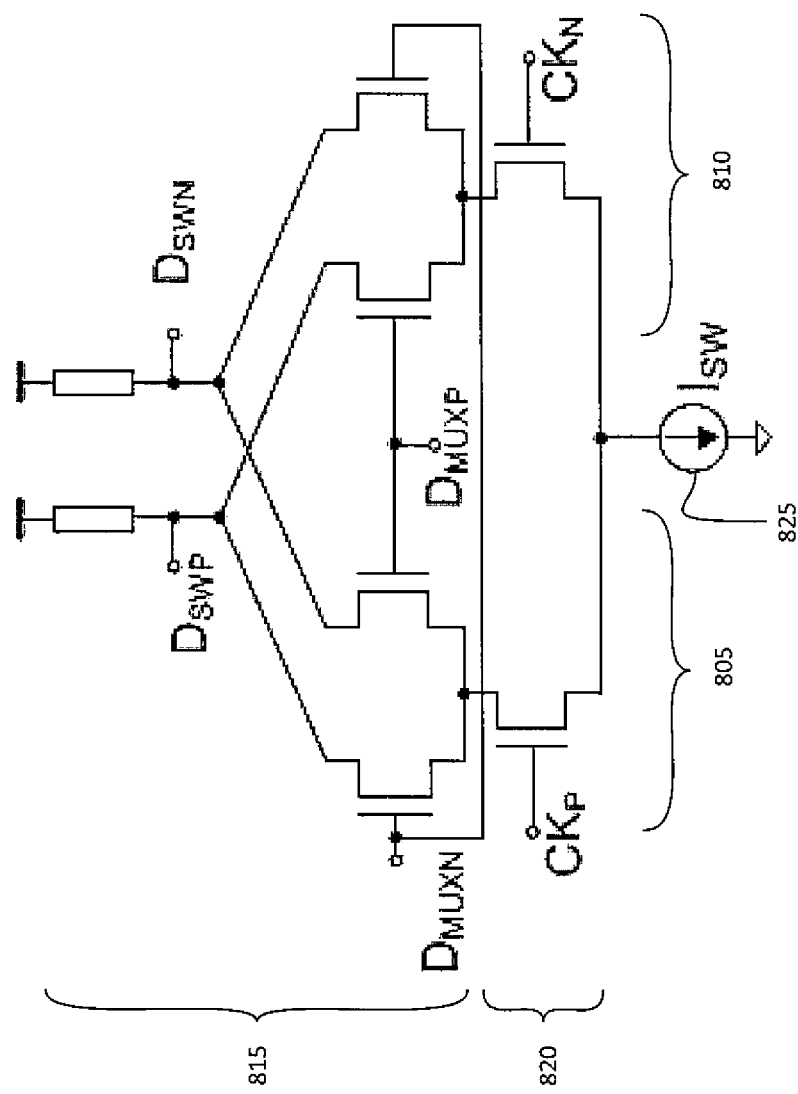
FIG. 8 is a schematic diagram of a Gilbert cell based per-bit switcher according to an embodiment of the present invention.

The blocks of FIG. 3 may be constructed according to the circuits of FIGS. 4, 5, and 6A-6B (with the circuit of FIG. 4 being implemented either in the manner of the circuit of FIG. 7 or in the manner of the circuit of FIG. 8). In particular, the output multiplexer of FIG. 3 (which is an output multiplexer including a per-bit switcher) may be constructed according to FIG. 4; the second per-bit switcher 310 may have the characteristics of the switch of FIG. 5, which is a parallel clock controlled double-pole, double-throw switch; and the pre-driver and driver of FIG. 3 may be each have a differential pair configuration according to the circuits of FIGS. 6A and 6B.

Referring to FIG. 4, in one embodiment the function of a per-bit switcher (corresponding to the first multiplier 210 of FIG. 2) is, as mentioned above, incorporated into the output multiplexer. The output multiplexer of FIG. 4 includes a left arm 405 and a right arm 410, each arm 405, 410 including a differential pair 415 and a control transistor 420. The control transistors 420 control current flow from the respective differential pairs 415 to a current source 425. The inclusion of the per-bit switcher is accomplished by changing the input connections, e.g., by interchanging the $D_{OP}$ and $D_{ON}$ connections, so that the right-hand arm of the output multiplexer, when active, inverts the transmitted bit. The differential CK input (including $CK_P$ and $CK_N$) functions as a select input, selecting whether the even input bit, or the inverse of the odd input bit, is transmitted to the output. In particular, in the output multiplexer of FIG. 4, when $CK_P$ is high, the data bit from the even data input line (of the two-bit parallel bus) is transmitted to the output of the output multiplexer; and when $CK_N$ is high (and $CK_P$ is low), the inverse of the data from the odd data input line is transmitted to the output of the output multiplexer. Thus the output multiplexer of FIG. 4 is configured to include a per-bit switcher.

Figure 5:
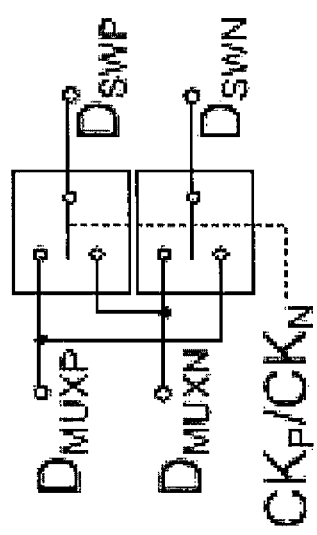
FIG. 5 is a conceptual schematic diagram of a per-bit switcher according to an embodiment of the present invention.
Figure 6B:
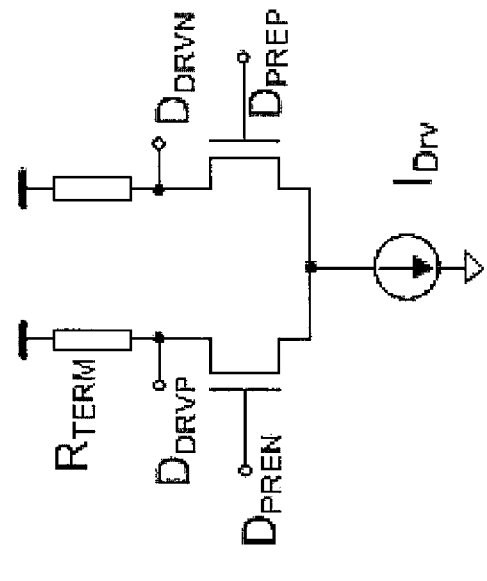
FIG. 6B is a schematic diagram of a driver according to an embodiment of the present invention.
Figure 6A:
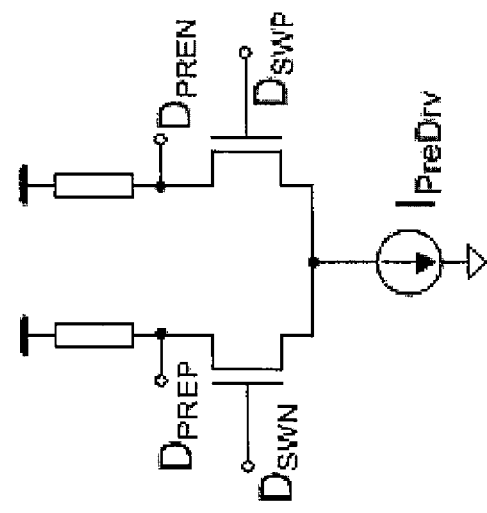
FIG. 6A is a schematic diagram of a pre-driver according to an embodiment of the present invention.

Referring to FIG. 5, in one embodiment, the second per-bit switcher 310 (FIG. 3) (corresponding to the second multiplier 220 of FIG. 2) operates conceptually as a double-pole, double throw switch controlled by the select input CK. The effect of the second per-bit switcher is, (i) when the parallel clock is high (i.e., when $CK_P$ is high and $CK_N$ is low), to connect the positive output $D_{MUXP}$ of the multiplexer to the positive $D_{SWP}$ output of the per-bit switcher and to connect the negative output $D_{MUXN}$ of the multiplexer to the negative output $D_{SWN}$ of the per-bit switcher, and (ii) when the parallel clock is low (i.e., when $CK_P$ is low and $CK_N$ is high), to connect the positive output $D_{MUXP}$ of the multiplexer to the negative output $D_{SWN}$ of the per-bit switcher and to connect the negative output $D_{MUXN}$ of the multiplexer to the positive output $D_{SWP}$ of the per-bit switcher. The pre-driver and driver of FIGS. 6A and 6B may have similar circuits to those of FIGS. 1B and 1C, respectively.

Referring to FIG. 7, in one embodiment, the second per-bit switcher is implemented with four pass gates 705, including an upper pair of pass gates 705 producing a $D_{SWP}$ output, and a lower pair of pass gates 705 producing a $D_{SWN}$ output. The $D_{SWP}$ output has the value of $D_{MUXP}$ when $CK_P$ is high (and $CK_N$ is low), and it has the value $D_{MUXN}$ when $CK_P$ is low (and $CK_N$ is high). The $D_{SWN}$ output has the value $D_{MUXN}$ when $CK_P$ is high (and $CK_N$ is low, and it has the value $D_{MUXP}$ when $CK_P$ is low (and $CK_N$ is high). In this embodiment the differential CK input (including $CK_P$ and $CK_N$) functions as a select input, selecting whether the input bit, or the inverse of the input bit, is transmitted to the output.

In another embodiment, referring to FIG. 8, the second per-bit switcher is implemented with a Gilbert cell, i.e., with a circuit including a left arm 805 and a right arm 810, each arm 805, 810 including a differential pair and a control transistor. In particular, the Gilbert cell of FIG. 8 includes a left arm 805 and a right arm 810, each including a differential pair 815 and a control transistor 820. The control transistors 820 control current flow from the respective differential pairs 815 to a current source 825. When $CK_P$ is high and $CK_N$ is low, the right control transistor is turned off and the left control transistor 820 is turned on (enabling the differential pair 815 in the left arm 805), and the bit represented by $D_{MUXN}$ and $D_{MUXP}$ is transmitted, without being inverted, to the output of the second per-bit switcher. When $CK_N$ is high and $CK_P$ is low, the right control transistor 820 is turned on (enabling the differential pair 815 in the right arm 810) and the left control transistor 820 is turned off, and the bit represented by $D_{MUXN}$ and $D_{MUXP}$ is transmitted, inverted, to the output of the second per-bit switcher.

In one embodiment the circuits of FIGS. 4, 5, and 6A-6B are connected (e.g., directly connected) in a cascade (as shown in FIG. 3, with the circuit of FIG. 4 being implemented in the manner of the circuit of either FIG. 7 or FIG. 8), to form a composite filter as illustrated in FIGS. 2A-2C. The central filter may be a low-pass filter formed by suitable selection of the existing components of the circuits of FIGS. 4-8, e.g., by suitable selection of the resistances of the output resistors of the output multiplexer. In one embodiment, the dominant pole of the central filter is determined by the combination of the output impedance (e.g., the output resistors) of the output multiplexer and one or more capacitances in the circuit, including the drain capacitances of the output multiplexer differential pair transistors, parasitic wire capacitance, and the input impedance of the load, e.g., the gate capacitance of the differential pair transistors of the Gilbert cell, if a Gilbert cell is used for the per-bit switcher 310. In this embodiment, the signal on each of the positive conductor and the negative conductor at the output of the output multiplexer is filtered with a respective one of two low-pass filters, which together form a differential resistor-capacitor (RC) filter. The load resistors of the output multiplexer may be tunable resistors, e.g., their value may be adjusted by adjusting dimensions of corresponding integrated circuit (IC) elements, or they may be implemented as transistors each of which has a bias point controlled, at design time or during operation, to provide a suitable resistance value.

The components of the transmitter may be designed or selected so that the pole frequency (e.g., the dominant pole frequency) of the central filter is approximately matched (e.g., substantially matched or about equal) to the dominant pole frequency of the transmission channel elements following the output multiplexer and the central (low-pass) filter. These transmission channel elements may have several poles. For example, the second per-bit switcher may have a pole. If the second per-bit switcher is constructed of pass gates (as in FIG. 7), the per-bit switcher pole may be the result of the finite on-resistance of the pass gate transistors and output and load capacitances of the elements (e.g., transistors) driving and driven by the pass gates, respectively. If a Gilbert cell per-bit switcher is used, the pole of the second per-bit switcher may be determined by the output resistors, the drain capacitance of the Gilbert cell differential pair transistors, and the gate capacitance of the pre-driver transistors. The pre-driver and the driver may each also introduce a pole into the frequency response. The channel (e.g., a transmission line connecting the transmitter to a receiver) may also introduce a pole. In one embodiment the channel pole is the dominant (i.e., lowest-frequency) pole of the elements following the output multiplexer, and the output multiplexer circuit is designed so that the output multiplexer pole frequency is approximately matched (e.g., substantially matched or about equal) to the channel pole.

Figure 9:
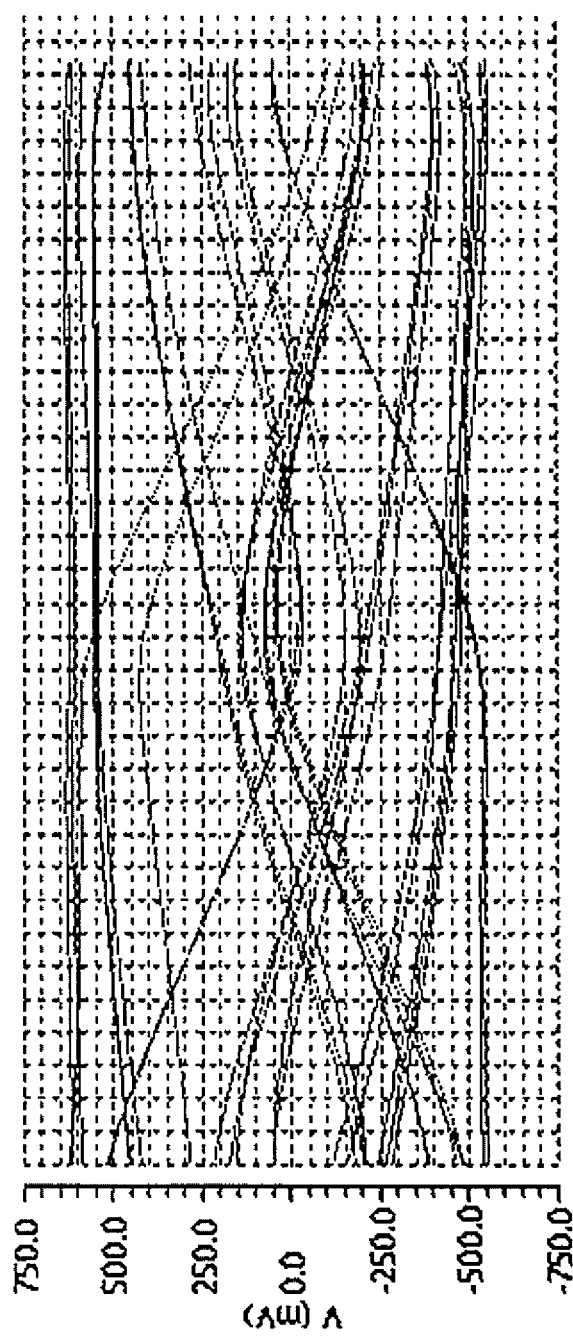
FIG. 9 is a simulated eye diagram for a channel with high-frequency loss.
Figure 10:
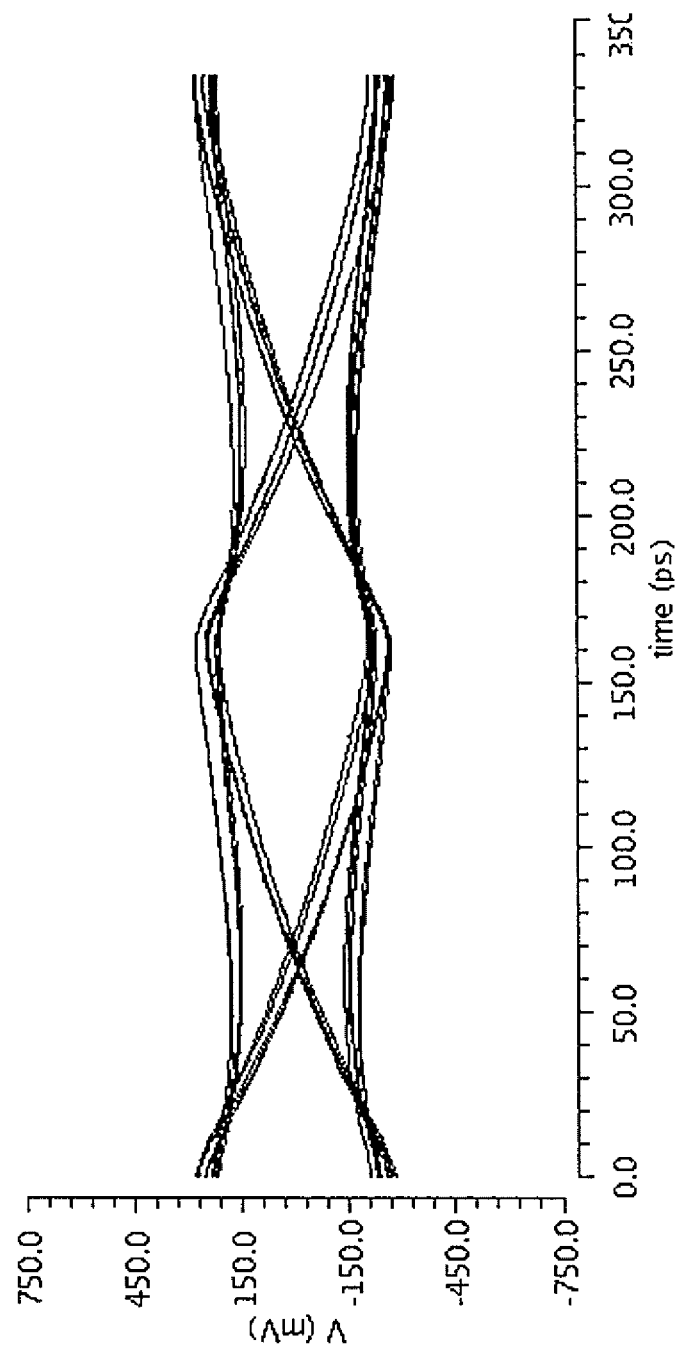
FIG. 10 is a simulated eye diagram for transmitter with switching equalization driving a channel with high-frequency loss, according to an embodiment of the present invention.

Referring to FIG. 9, in one embodiment, a channel with an uncompensated low-pass response exhibits significant inter-symbol interference and a closed simulated eye diagram. The same channel, when driven in the simulation by a transmitter having a composite high-pass filter according to an embodiment of the present invention, exhibits the open eye diagram of FIG. 10.

Figure 11:
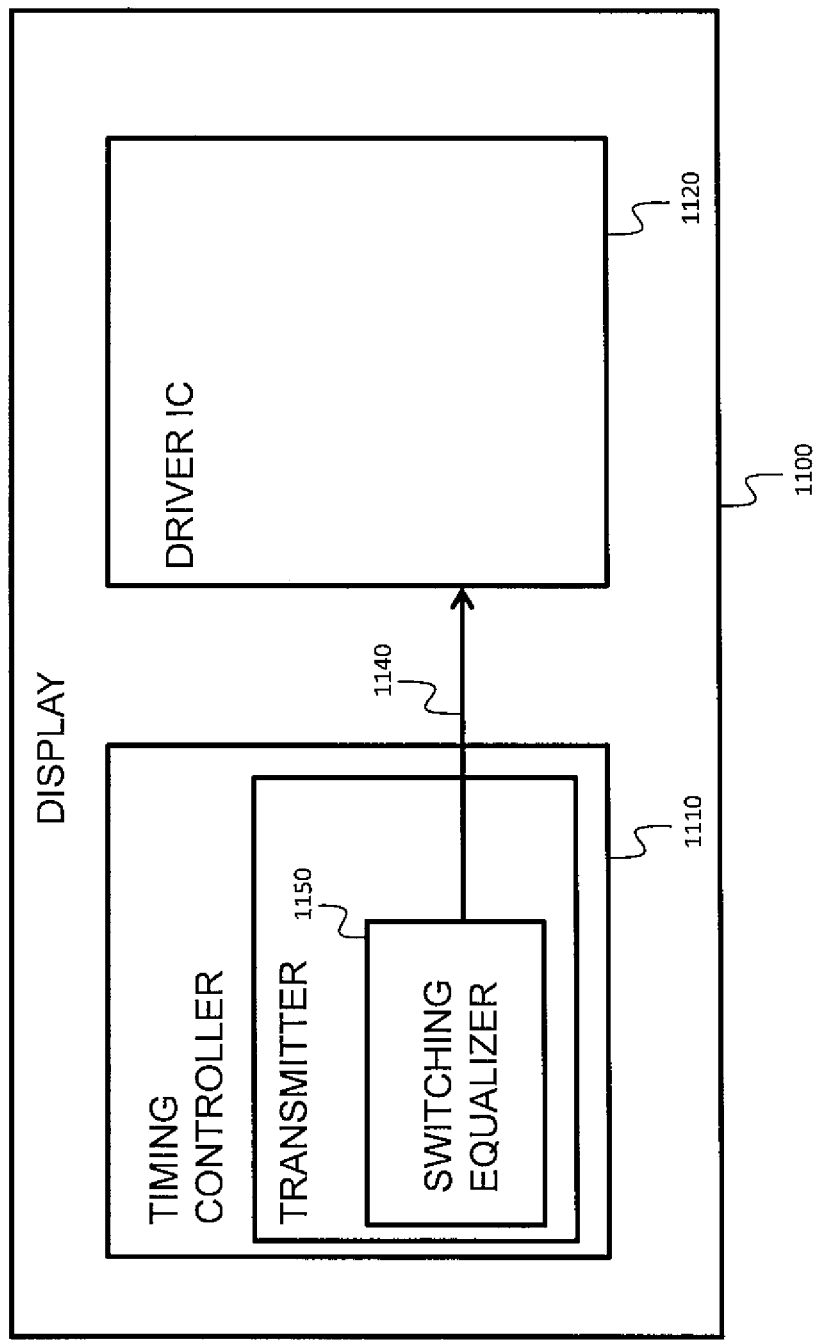
FIG. 11 is a block diagram of a display including a timing controller containing a transmitter with switching equalization according to an embodiment of the present invention.

Referring to FIG. 11, in one embodiment a display 1100 includes a timing controller 1110 and a driver integrated circuit (IC) 1120, and the timing controller 1110 is configured to send high-speed serial data, on a serial data link including a data lane 1140, to the driver IC 1120. The timing controller transmits the high-speed serial data from a circuit including a switching equalizer 1150 constructed according to an embodiment of the present invention. Here, in embodiments of the present invention, the display is an organic light emitting diode (OLED) display or a liquid crystal display (LCD).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

The transmitter and/or any other relevant devices or components according to embodiments of the present invention described herein may be implemented utilizing any suitable hardware, firmware (e.g. an application-specific integrated circuit), software, or a combination of software, firmware, and hardware. For example, the various components of the transmitter may be formed on one integrated circuit (IC) chip or on separate IC chips. Further, the various components of the transmitter may be implemented on a flexible printed circuit film, a tape carrier package (TCP), a printed circuit board (PCB), or formed on one substrate. Further, the various components of the transmitter may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although exemplary embodiments of a system and method for transmitter switching equalization for high speed links have been specifically described and illustrated herein, many modifications and variations will be apparent to those skilled in the art. Accordingly, it is to be understood that a system and method for transmitter switching equalization for high speed links constructed according to principles of this invention may be embodied other than as specifically described herein. The invention is also defined in the following claims, and equivalents thereof.

What is claimed is:
1. A transmitter for transmitting a serial stream of bits, each bit having a polarity, the transmitter comprising:
 a first per-bit switcher configured to switch the polarity of every other bit of the serial stream of bits to form a switched signal;

a filter configured to filter the switched signal to form a filtered signal; and a second per-bit switcher configured to switch the polarity of every other bit of the filtered signal.

2. The transmitter of claim 1, comprising a multiplexer comprising the first per-bit switcher and the filter.

3. The transmitter of claim 2, wherein:
the filter is a differential resistor-capacitor (RC) low-pass filter,
the multiplexer comprises a first output resistor and a second output resistor, and
the first and second output resistors form, with one or more capacitances, the differential resistor-capacitor (RC) low-pass filter.

4. The transmitter of claim 3, wherein a drain capacitance of a transistor of the multiplexer is a capacitance of the one or more capacitances.

5. The transmitter of claim 2, wherein the multiplexer comprises:
a first differential pair;
a first control transistor to enable the first differential pair;
a second differential pair; and
a second control transistor to enable the second differential pair.

6. The transmitter of claim 1, wherein the filter is a low-pass filter having a dominant pole frequency being about the same as a dominant pole frequency of a serial transmission channel.

7. The transmitter of claim 1, wherein the second per-bit switcher comprises:
a first differential pair;
a first control transistor to enable the first differential pair;
a second differential pair; and
a second control transistor to enable the second differential pair.

8. The transmitter of claim 2, wherein the multiplexer has a select input, and the second per-bit switcher has a select input connected to the select input of the multiplexer.

9. The transmitter of claim 1, further comprising a pre-driver connected to the second per-bit switcher, and a driver connected to the pre-driver, each of the driver and the pre-driver comprising two transistors in a differential pair configuration.

10. A transmitter for transmitting a serial stream of bits, the transmitter having an input and comprising:
a multiplexer connected to the input of the transmitter, the multiplexer configured to form a serialized signal; and
a per-bit switcher directly connected to the multiplexer, the per-bit switcher configured only to invert every other bit of the serialized signal.

11. The transmitter of claim 10, wherein the multiplexer is configured to convert a two-bit wide parallel data stream into a first serial stream of bits, and to invert every other bit in the first serial stream of bits.

12. The transmitter of claim 11, wherein the transmitter is configured to filter the first serial stream of bits with a low-pass filter.

13. A system comprising:
the transmitter of claim 12; and
a serial transmission channel, wherein a dominant pole of the low-pass filter is at about the same frequency as a dominant pole of the serial transmission channel.

14. The transmitter of claim 10, further comprising a pre-drive buffer connected to the per-bit switcher.

15. The transmitter of claim 14, wherein an output impedance of the multiplexer and an input impedance of the per-bit switcher are configured as a low-pass filter.

16. A system comprising:
the transmitter of claim 15; and
a serial transmission channel, wherein a dominant pole of the low-pass filter is at about the same frequency as a dominant pole of the serial transmission channel.

17. The transmitter of claim 14, further comprising a drive buffer connected to the pre-drive buffer.

18. A display comprising:
a timing controller;
a driver integrated circuit (IC); and
a serial data link comprising a serial transmission channel, the serial data link connecting the timing controller and the driver IC,
the timing controller comprising a transmitter,
the transmitter having an input and comprising:
a multiplexer connected to the input of the transmitter, the multiplexer configured to form a serialized signal; and
a per-bit switcher directly connected to the multiplexer, the per-bit switcher configured only to invert every other bit of the serialized signal.

19. The display of claim 18, wherein the multiplexer is configured to convert a two-bit wide parallel data stream into a first serial stream of bits, and to invert every other bit in the first serial stream of bits.

20. A system comprising:
the display of claim 19; and
the serial transmission channel, wherein:
the transmitter is configured to filter the first serial stream of bits with a low-pass filter, and
a dominant pole of the low-pass filter is at about the same frequency as a dominant pole of the serial transmission channel.

* * * * *